(12) United States Patent
Badillo et al.

(10) Patent No.: US 6,770,009 B2
(45) Date of Patent: Aug. 3, 2004

(54) ENGINE SPEED CONTROL IN A VEHICLE DURING A TRANSITION OF SUCH VEHICLE FROM REST TO A MOVING CONDITION

(75) Inventors: Edward Badillo, Flat Rock, MI (US); Ace K. Kue, Franklin, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/248,076

(22) Filed: Dec. 16, 2002

(65) Prior Publication Data

US 2004/0112336 A1 Jun. 17, 2004

(51) Int. Cl.[7] ............................................. F16H 59/74
(52) U.S. Cl. ................................. 477/102; 123/406.51
(58) Field of Search ..................... 477/102; 123/406.23, 123/406.24, 406.51, 406.25

(56) References Cited

U.S. PATENT DOCUMENTS

| | | | |
|---|---|---|---|
| 4,373,489 A | | 2/1983 | Yamaguchi |
| 4,436,072 A | * | 3/1984 | Suzuki et al. .......... 123/406.45 |
| 4,718,014 A | * | 1/1988 | Kobayashi et al. ......... 701/101 |
| 4,887,573 A | * | 12/1989 | Fujiwara et al. ....... 123/406.51 |
| 4,924,832 A | * | 5/1990 | Abe ........................... 477/102 |
| 5,010,863 A | * | 4/1991 | Ishida et al. ........... 123/179.18 |
| 5,668,727 A | | 9/1997 | Pellerito et al. |
| 5,934,247 A | | 8/1999 | Hashimoto et al. |
| 6,119,063 A | | 9/2000 | Hieb et al. |
| 6,131,546 A | * | 10/2000 | Vogt et al. ............. 123/406.23 |

* cited by examiner

Primary Examiner—Dirk Wright
(74) Attorney, Agent, or Firm—Diane D. Brehob

(57) ABSTRACT

A method and system for controlling engine speed during a vehicle launch (from a rest condition to a moving condition), such vehicle having the engine is coupled to an automatic shifting manual transmission. The method comprises determining a spark timing offset based on one or more of engine speed, a time rate of engine speed, relative air charge, engine coolant temperature, accelerator pedal position, and a time rate of change of accelerator pedal position. A new spark timing is determined as the base spark timing minus the spark timing offset. By adjusting spark timing based primarily on a time rate of change of engine speed, engine speed fluctuations arising during a clutch engagement associated with vehicle launch are largely attenuated.

22 Claims, 6 Drawing Sheets

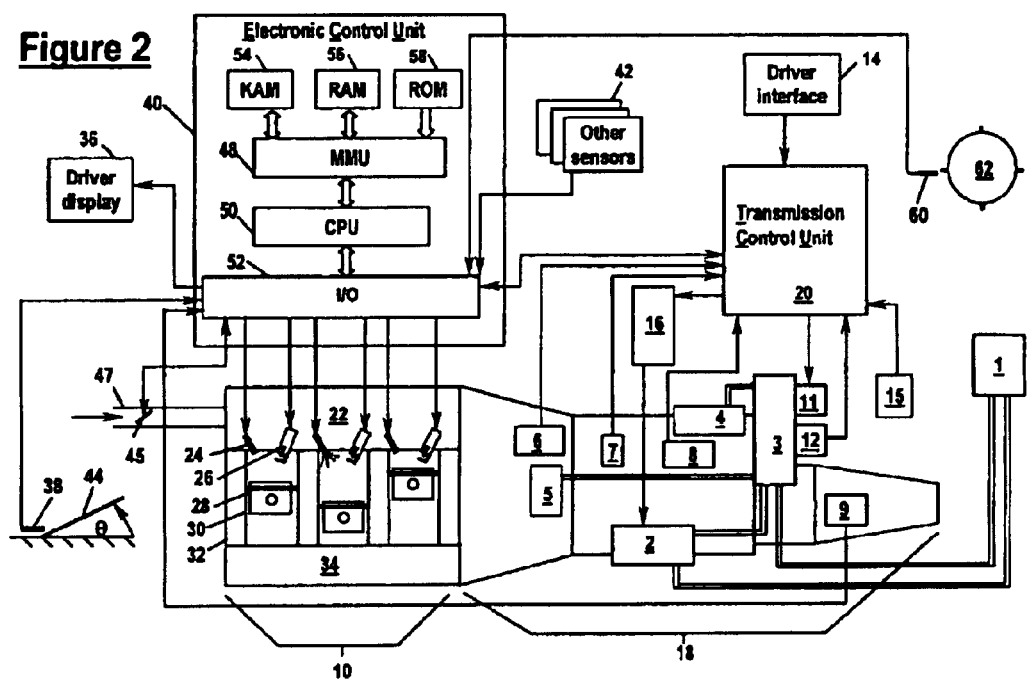

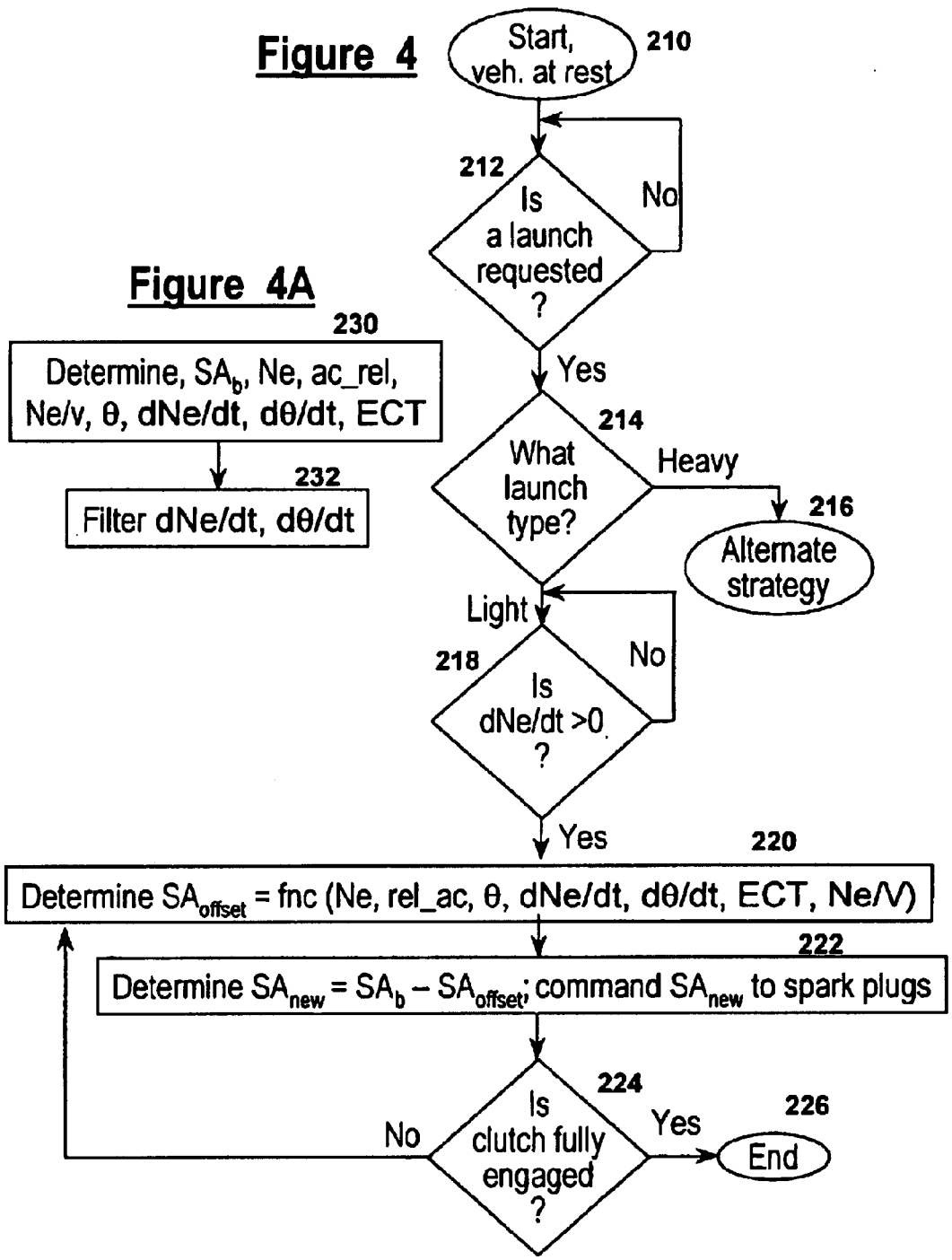

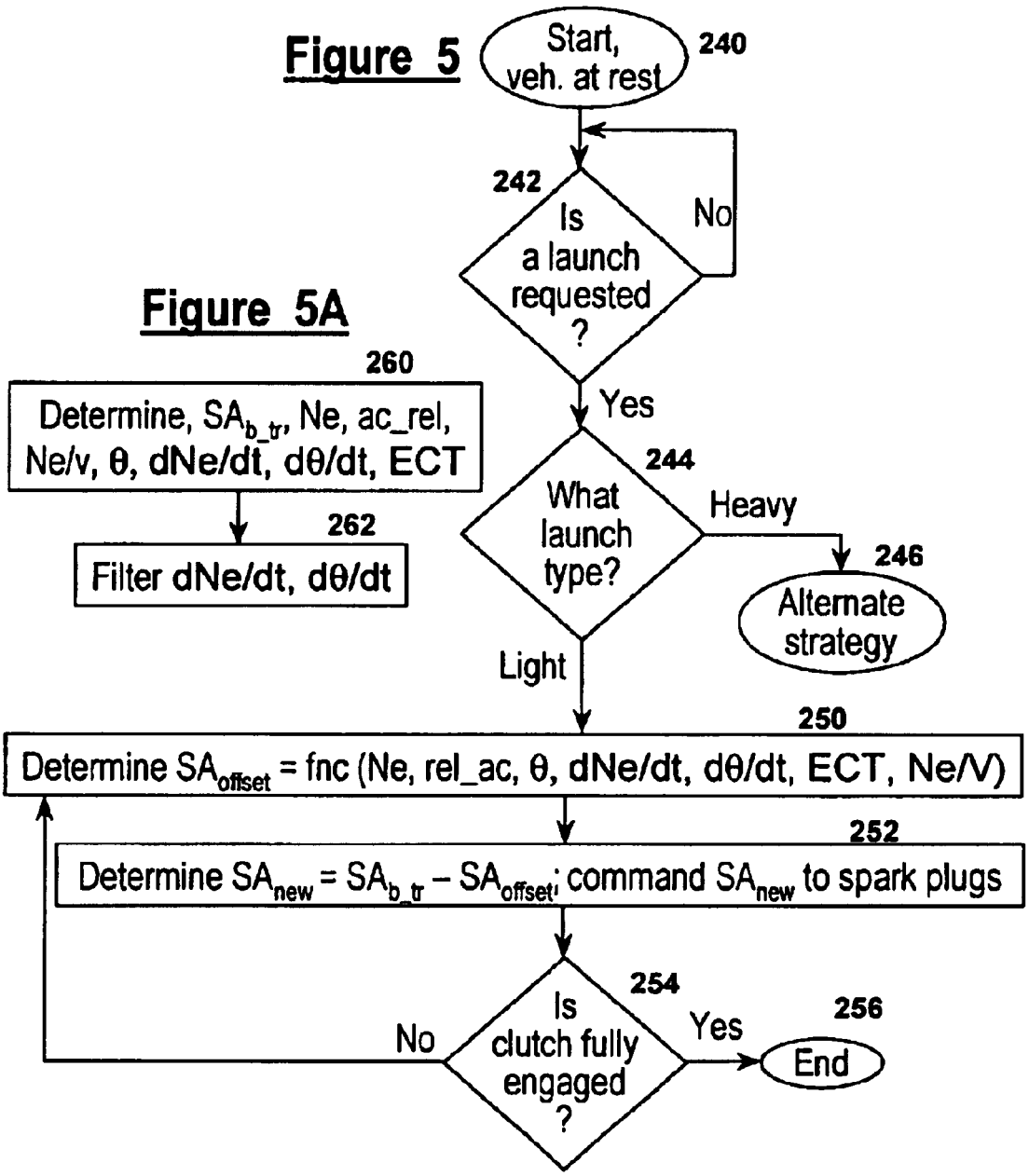

ENGINE SPEED CONTROL IN A VEHICLE DURING A TRANSITION OF SUCH VEHICLE FROM REST TO A MOVING CONDITION

BACKGROUND OF INVENTION

1. Field of the invention

The invention relates to a method and a system for controlling engine speed and more particularly to a method for controlling engine speed when a vehicle having such engine transitions from a rest condition to a moving condition (i.e., a vehicle launch).

2. Background of the invention

As is known in the art, with a vehicle equipped with a manual transmission, during a typical, driver-actuated gearshift event, the driver matches the torque during the phases of the shift by adjusting the accelerator pedal position. The pedal position actuates either mechanically or electronically, the intake throttle valve.

As is also known in the art, with an Automatic Shift Manual (ASM) transmission the traditional manual gearshift lever is replaced with operator hand-operated up-shift and down-shift paddles which are part of a driver interface. The ASM transmission uses a sophisticated electro-mechanical control system to eliminate clutch pedal control by the operator of the vehicle completely. More particularly, with an ASM transmission, the driver makes gear selections with the easy-to-operate electronic paddles while the vehicle's control system executes the driver's decision. During such execution, the system co-ordinates all gear-change events including engine torque ramp-down and ramp-up. An ASM transmission is an automatic manual gearbox because the mechanical linkages, which would commonly be controlled by the operator of the vehicle in a manual transmission, are supplanted by high-speed electrohydraulic actuators.

There are two operator selectable modes by which an ASM transmission can operate: (1) An Operator Select-ASM (OS-ASM) mode; and (2) an Automatic Select-ASM (AS-ASM). The particular mode is selected by the operator by pressing one of a pair of operator hand-operated buttons which are also part of the driver interface. In the OS-ASM mode the operator depresses the appropriate upshift or downshift paddle to indicate a desire for a gear shift; in the AS-ASM mode the demand for a gearshift is not under the operator's control but rather under control of the system itself. For example, in the AS-ASM mode, the demand for a gearshift is produced by an engine control unit and is computed as a function of driver demanded torque and engine operating conditions.

In the prior art, the ASM gearshift event is performed analogously to that of a manual transmission except that the engine control unit aboard the vehicle controls: the intake throttle valve position and spark timing. A gearshift as a function of time, according to the prior art, is shown in FIG. 1 for a vehicle launch. A launch is when a resting vehicle is caused to drive away. At the left hand side of FIG. 1, the clutch is fully open. Shortly thereafter, a launch is requested and the clutch is caused to partially close. As a consequence of the clutch being partially closed, engine speed drops. Clutch pressure is controlled based on engine speed, as well as driver demanded torque. So, when engine speed starts to drop, the clutch is caused to retract to a fully open position. As a consequence of the clutch fully opening, engine speed flares. This continues in an unstable fashion causing the engine speed to deviate wider and wider. This vast fluctuation in clutch position and engine speed leads to an undesirable bucking of the vehicle. Typically, the driver intervenes, as was the case for that shown in FIG. 1, by adjusting the accelerator pedal position. If the driver depresses the accelerator pedal, the launch becomes a heavier launch and the condition can be exited. In the example shown in FIG. 1, engine speed fluctuations are mostly damped and the clutch is allowed to fully close by the end of the time shown in FIG. 1. In some situations, which require the most precise and slow vehicle maneuvers, such as positioning a car on a transporter for delivery, the operator of the vehicle desires a very slow vehicle speed. Thus, the driver intervenes by backing off the accelerator pedal and the clutch is returned to a fully open position. When the driver reapplies pressure to the accelerator pedal to attain a slightly higher vehicle speed, the bucking phenomenon recurs.

In a transition from the vehicle being at rest to moving, (i.e., a vehicle launch), it has been found that it is difficult to provide a reliably smooth launch, particularly when the operator is requesting a gradual launch, such as might be requested to undergo a parking lot maneuver.

SUMMARY OF INVENTION

In accordance with the present invention, a method and system are provided for controlling spark timing for spark plugs disposed in cylinders of an internal combustion engine. The method includes determining a base spark timing for such spark plugs. A time rate of change dNe/dt of engine speed is determined. The base timing is modified in accordance with the determined dNe/dt.

In accordance with another feature of the invention, a method and system are provided for use in controlling engine torque of an internal combustion engine, such torque being controlled by a spark timing of spark plugs disposed in engine cylinders. A base spark timing for such spark plugs is determined in an engine control unit electronically coupled to the spark plugs. A time rate of change dNe/dt of engine speed is determined. A spark timing offset from the base timing is determined for the spark plugs. The spark timing offset is a function of the determined dNe/dt. A new spark timing is determined for the spark plugs, such new spark timing being a function of the base spark timing and said offset spark timing. The engine control unit commands said new spark timing to the spark plugs.

According to another aspect of the invention, the spark timing offset is a function also of one or more of engine speed, engine coolant temperature, accelerator pedal position, a time rate of change of accelerator pedal position, a relative air charge, and engine speed divided by vehicle speed.

According to an aspect of the invention, the offset spark timing is set to zero when the time rate of change of engine timing is negative.

In one embodiment, a method and system are provided for controlling spark timing for spark plugs disposed in cylinders of an internal combustion engine of a vehicle. The method includes determining a launch requested by an operator of the vehicle. A determination is made of a base spark timing for such spark plugs. A time rate of change dNe/dt of engine speed is determined during the vehicle launch. The base timing is modified during the launch in accordance with the determined dNe/dt.

In one embodiment, the base spark timing is a spark advance which provides the best torque (MBT spark timing, discussed in more detail below). Alternatively, the base spark timing is retarded from MBT spark timing thereby providing a torque reserve.

The inventors of the present invention have found that the unstable vehicle launch can be prevented by a method for controlling torque in an internal combustion engine which is coupled to an automatic shifting manual transmission and installed in the vehicle. The torque is controlled by adjusting a spark timing of spark plugs disposed in engine cylinders. The method includes determining engine speed, and adjusting spark timing based on a derivative of engine speed.

More particularly, the inventors of the present invention have recognized the problem underlying the phenomena is that the point at which the clutch plates first touch, the kiss point, i.e., when there is first some torque delivery between the clutch plate on the engine side to the clutch plate on the transmission side, is not known. One solution would be to very slowly engage the clutch so that the kiss point could be detected. However, this is an unsatisfactory clutch engagement which leads to excessive clutch slippage resulting to excessive clutch wear and overheating. An advantage of the invention is that spark timing affects engine torque rapidly. Therefore, when an initial portion of an engine overspeed condition is detected, spark is adjusted immediately and it affects engine torque in the next cycle, thereby thwarting engine overspeed. Because of the fast actuation provided by adjusting spark timing, an unstable control during vehicle launch is prevented.

BRIEF DESCRIPTION OF DRAWINGS

The advantages described herein will be more fully understood by reading an example of an embodiment in which the invention is used to advantage, referred to herein as the Detailed Description, with reference to the drawings wherein:

FIG. 2 is a schematic diagram of an internal combustion engine equipped with an ASM transmission, according to an aspect of the present invention;

FIG. 4 is a flowchart of a launch strategy according to the present invention;

FIG. 4A is a flowchart showing the determination of values of engine parameters;

FIG. 5 is a flowchart of a launch strategy according to the present invention;

FIG. 5A is a flowchart showing the determination of values of engine parameters.

DETAILED DESCRIPTION

Figure 1:
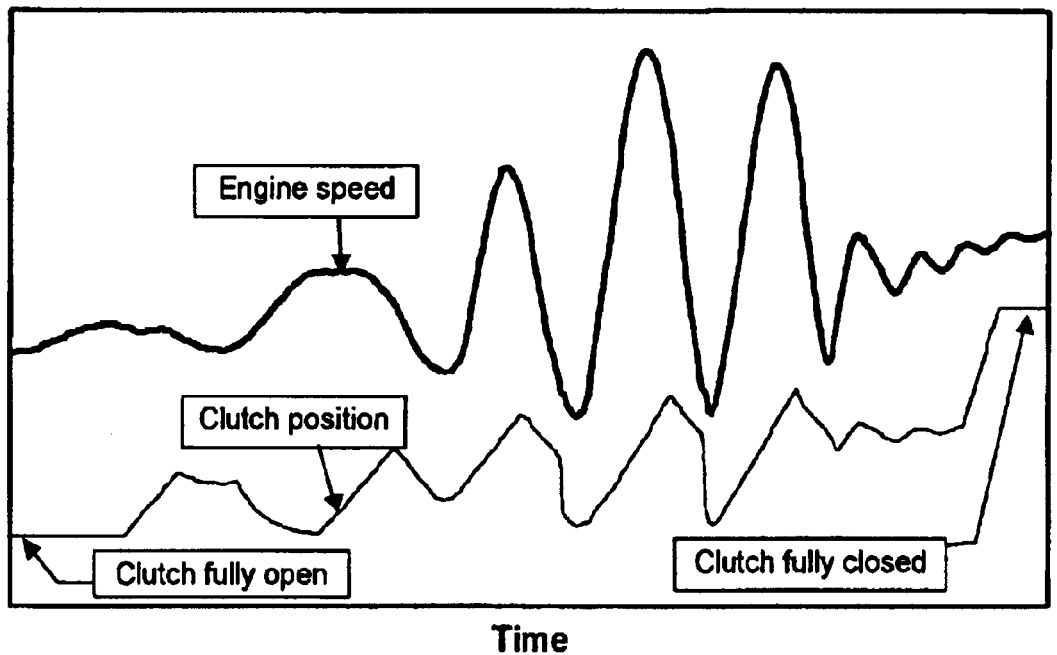
FIG. 1 is a timeline of a launch with an automatic shifting manual transmission coupled to an internal combustion engine according to the prior art.

Referring to FIG. 2, an engine 10 is shown coupled to an automatic shift manual (ASM) transmission 18. The ASM transmission 18 is hydraulically actuated. The hydraulic fluid reservoir 1 is connected by hydraulic lines to an electrically-actuated hydraulic pump 2 and shift actuator 3. Shift actuator 3 is connected by hydraulic lines to clutch actuator 5 (i.e., a clutch) and a pressure accumulator 4. Hydraulic pump 2 is coupled to transmission control unit (TCU) 20 via a pump relay 16. TCU 20 receives input from clutch position sensor 6, input shaft speed sensor 7, two gear position sensors 8, output shaft speed sensor 9, pressure sensor 12, driver interface 14, and crank interrupt relay 115. Transmission control unit 20 is coupled to an engine control unit (ECU) 40 by a computer area network (CAN) connection, or other protocol capable of transferring data between the two control units, e.g., hardwired or wireless. TCU 20 controls four solenoid valves 11 which direct high pressure fluid to move the shift lever rods (not shown) along the H pattern to change gears.

Figure 2A:
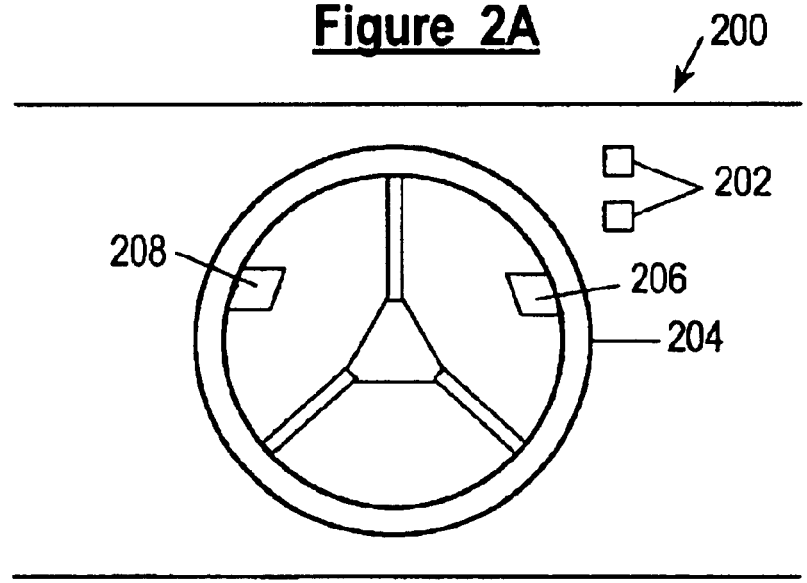
FIG. 2A is a schematic diagram of part of a vehicle dashboard showing driver interface components.

Referring now to FIG. 2A, driver interface 14 includes operator hand-operated shift paddles 206 and 208 and mode select buttons 202. Driver interface 14 is electronically coupled to TCU 20, as shown in FIG. 2. Shift paddles 206 and 208 are operated by the driver to indicate a desire for an upshift or a downshift, respectively. In one embodiment, one of mode buttons 202 is used by the operator to indicate AS-ASM or OS-ASM mode. The other mode button 202 is used to indicate a shift style desired by the operator: normal or aggressive. Alternatively, mode buttons 202 is a combination of push buttons, toggle switches, rotary switches, or any other switch.

Also, shown in FIG. 2 is an accelerator pedal 44 coupled to pedal position sensor 38. The driver of the vehicle actuates accelerator pedal 44 to indicate the driver request for torque. A signal indicative of position of accelerator pedal 44 is communicated to ECU 40 by pedal position sensor 38. Also shown in FIG. 2 is a vehicle speed sensor 60 which receives signals from a plate 62 coupled to an axle (not shown) of the vehicle. Plate 62 has four teeth which cause a signal to be produced when they come into proximity with sensor 60. By measuring the time in between pulses and knowing the wheel diameter, vehicle speed is determined. The vehicle speed sensing system shown in FIG. 2 is by way of example. Alternatively, other methods can be employed.

Referring now to FIG. 2A, in the OS-ASM, mode the shift paddles 206, 208 are actuated to indicate both the type of shift, i.e., up or down, and when a gear shift is desired. In a second operating mode, AS-ASM, the TCU 20 requests a shift based on operating condition and communicates that request with ECU 40. Alternatively, a request for a gearshift to an AS-ASM transmission could be provided by other modules within the vehicle.

Referring again to FIG. 2, engine 10 has a lower end 34, a cylinder head 22, and a block 32. Within the block are cylinders 30 in which pistons 28 reciprocate. Fuel injectors 24 and spark plugs 26 are disposed in cylinder head 22. This fueling configuration is known as direct fuel injection. The present invention applies to other fuel delivery methods including, but not limited to, port fuel injection, in which the injectors are disposed in the intake ports outside the cylinders, carburetion, central fuel injection, in which injectors are disposed in the intake system upstream of where the intake splits to feed the cylinders, and combinations thereof. Engine 10 is supplied air through intake 47, which has throttle valve 45, which can be rotated to adjust the flow of air into engine 10.

Referring again to FIG. 2A, a portion of a dashboard 200 is shown. The steering wheel 204 is connected to a steering column (not shown), which comes through dashboard 200. Shift paddles 206 and 208 are depressed by the operator of the vehicle to indicate a desire for an upshift or a downshift, respectively. For example, depressing paddle 206 indicates a desire for an upshift from the current gear to one gear higher; depressing paddle 206 twice indicates a desire for an upshift from the current gear to two gears higher. Paddles 206 and 208 are shown in FIG. 1A attached to steering wheel 204 such that when steering wheel 204 is rotated, paddles 206 and 208 also rotate. Alternatively, the paddles 204, 206 can be attached to the steering column but adjacent to the outside rim of steering wheel 204. In this configuration, the paddles do not rotate with steering wheel 204. Regardless of configuration, paddles 206 and 208 are electronically coupled to TCU 20. Buttons 202 are on dashboard 200. By manipulating buttons 202, the operator indicates type of operating mode, OS-ASM or AS-ASM. In one embodiment, the driver can also indicate driving style desired: normal or aggressive, which refers to control of the transmission, which is not part of the present invention and not discussed further. Buttons 202 can be: toggle, rotating, push button, or other known types.

Figure 2B:
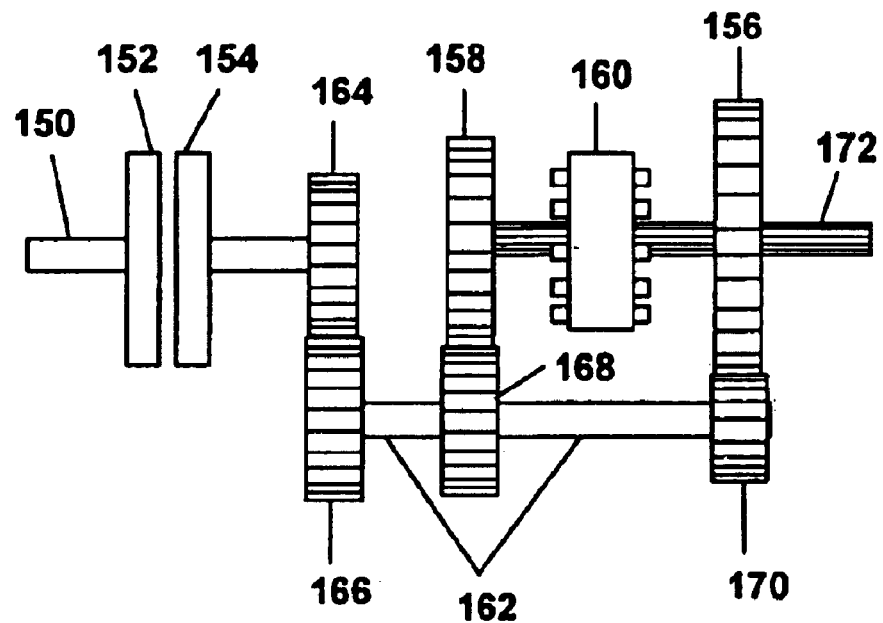
FIG. 2B is a schematic diagram of a two-speed manual transmission in which the clutch is open and the transmission is in neutral.

Referring now to FIG. 2B, a clutch, including plates 152 and 154, and a two-speed transmission is shown. Typically, manual transmissions have four to six gears. The gear set shown in FIG. 2B is merely an example and not intended to be limiting. Clutch plate 152 is fixed to shaft 150, which couples to the engine. Thus, the clutch plate 152 rotates at engine rotational speed at all times. In FIG. 2B, clutch plates 152 and 154 are apart; thus, the clutch is disengaged or open. In this situation, engine 10 is decoupled from the transmission. Clutch plate 154 is fixed to gear 164. Gear 164 meshes with gear 166, which is fixed to layshaft 162. Layshaft 162 also contains and is affixed to gears 168 and 170. Gears 168 and 170 mesh with gears 158 and 156, respectively. Shaft 172 is a spline shaft that is coupled to the driving wheels via a differential and driveshaft (not shown). Shaft 172 is not attached to gears 156 and 158. Instead, gears 156 and 158 have bearings (not shown) in between shaft 172 and each of gears 156 and 158 to allow 156 and 158 to rotate independently of shaft 172 and each other. Collar 160 is connected, through the splines, to shaft 172, thus spinning with shaft 172. The teeth on collar 160, called dog teeth, can be fit into corresponding holes on the sides of gears 156 and 158. In FIG. 2B, the collar is in a center position, decoupled from both gears 156 and 158. Thus, the transmission is in neutral. To select a gear, collar 160 is caused to move toward gear 1156, a lower gear, or toward gear 158, a higher gear. Making a change from gear 156 to gear 158 is called an upshift and vice versa is a downshift. The lever, or other mechanism, by which collar 160 is caused to couple to a gear is not shown.

Figure 2C:
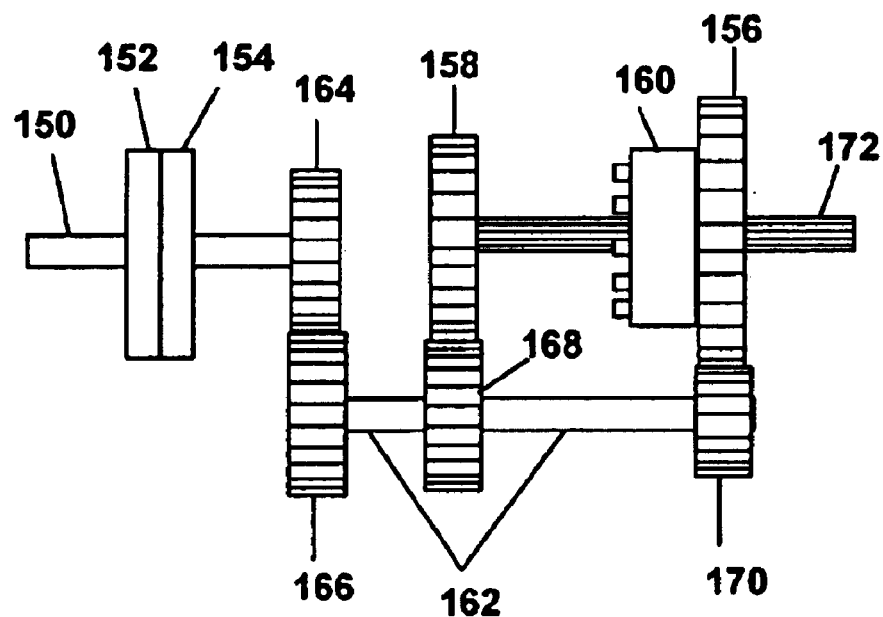
FIG. 2C is a schematic diagram of a two-speed manual transmission in which the clutch is closed and the transmission is a first gear.

Referring to FIG. 2C, clutch plates 152 and 154 are shown in proximity to each other. By a force applied to force clutch plates 152 and 154 together, the two to rotate together due to friction. The position shown in FIG. 2C is an engaged, or closed, clutch. Also shown in FIG. 2C is collar 160 with dog teeth coupled to gear 156. In the configuration of FIG. 2C, shaft 150, plates 152 and 154, and gear 164 all rotate at engine speed. Layshaft 162, gears 166, 168, and 170 rotate at engine speed times the gear ratio between gears 164 and 166. Gear 158 rotates at the rotational rate of gear 168 times the gear ratio between gears 168 and 158. However, gear 158 is not coupled to layshaft 172 and has no effect on driving speed. Similarly, gear 156 rotates at the rotational rate of gear 170 times the gear ratio between gears 170 and 156. Because collar 160 is coupled to gear 156 via the dog teeth, collar 160 and gear 156 rotate at the same speed. Collar 160, being splined to shaft 172, causes shaft 172 to rotate at this same speed, also. In this way, the rotational speed between shaft 150 and shaft 172 is based on gears 164, 166, 170, and 158. If collar 160 were, instead, coupled to gear 158, the relative rotational speed of shafts 150 and 12 is based on gears 164, 166, 168, and 158.

Referring again to FIG. 2, ECU 40 is provided to control engine 10. ECU 40 has a microprocessor 50, called a central processing unit (CPU), in communication with memory management unit (MMU) 48. MMU 48 controls the movement of data among the various computer readable storage media and communicates data to and from CPU 50. The computer readable storage media preferably include volatile and nonvolatile storage in read-only memory (ROM) 58, random-access memory (RAM) 56, and keep-alive memory (KAM) 54, for example. KAM 54 may be used to store various operating variables while CPU 50 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 50 in controlling the engine or vehicle into which the engine is mounted. The computer-readable storage media may also include floppy disks, CD-ROMs, hard disks, and the like. CPU 50 communicates with various sensors and actuators via an input/output (I/O) interface 52. Example items actuated under control of CPU 50, through I/O interface 52, are fuel injection timing, fuel injection rate, fuel injection duration, throttle valve position, spark plug timing, exhaust gas recirculation valve position, and others. Driver display 36, which displays engine rpm, current gear and others to the operator, receives data via I/O interface 52. Sensors 42 communicating input through I/O interface 52 preferably include sensors indicating piston position, engine rotational speed, vehicle speed, coolant temperature, barometric pressure, exhaust gas recirculation valve position, intake manifold pressure, accelerator pedal position 38, throttle valve position, air temperature, exhaust temperature, exhaust stoichiometry, exhaust component concentration, air flow, and others. Some ECU 40 architectures do not contain MMU 48. If no MMU 48 is employed, CPU 50 manages data and connects directly to ROM 58, RAM 56, and KAM 54. Of course, the present invention could utilize more than one CPU 50 to provide engine control and ECU 40 may contain multiple ROM 58, RAM 56, and KAM 54 coupled to MMU 48 or CPU 50 depending upon the particular application. In FIG. 2, ECU 40 and TCU 20 are separate units. However, the functionality of the two could, be combined in a single control unit without departing from the spirit of the present invention.

Figure 3:
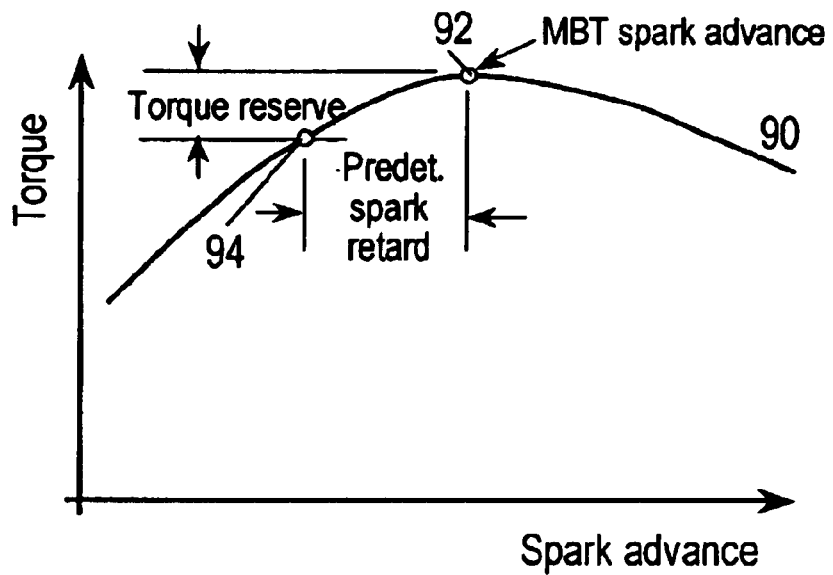
FIG. 3 is a graph of engine torque as a function of spark advance for a given engine operating condition.

Spark timing is used, in the present invention, to control engine torque during a vehicle launch. The relationship between engine torque and spark advance is shown in FIG. 3. For a given air flow rate, fuel delivery rate, and engine speed, the relationship between engine torque and spark advance is shown as curve 90 in FIG. 3. There is a spark advance timing 92, known as minimum spark advance for best torque (MBT) by those skilled in the art, which provides the highest engine torque for the given operating condition. If spark timing is either advanced or retarded from MBT, engine torque reduces. The fuel efficiency (not plotted in FIG. 3) is at a maximum at MBT. Thus, for fuel efficiency reasons it is desirable to operate the engine at MBT spark timing.

Continuing to refer to FIG. 3, although MBT spark timing 92 provides the maximum fuel efficiency and maximum torque, it is a less desirable operating point from a control standpoint. Because MBT spark advance 92 provides the maximum torque for the given operating condition, by adjusting spark advance alone, torque: can only be reduced. To control engine torque, it is desirable to have the capability to both increase and decrease engine torque. This can be accomplished by operating at a spark timing, which is retarded from MBT. (Although it appears that one could also choose to operate advanced of MBT, for exhaust emission reasons and others, it is more suitable to retard engine timing.) To determine the amount to retard the timing, a desired torque reserve is chosen. Torque reserve can be determined as an absolute number or a percentage of torque at MBT spark timing. Such a torque reserve is shown in FIG. 3. By intersecting the torque reserve with curve 90, point 94 is found, which is the spark timing with torque reserve. When operating at point 94, engine torque can be increased, by advancing spark timing toward MBT, and decreased, by retarding spark timing further from MBT.

Referring to FIG. 4, a strategy according to the present invention is shown. In step 210, the strategy is initiated when the vehicle is at rest. In step 212, a determination is made whether a launch is requested. A launch is determined based on the operator depressing paddle 206 and based the position of accelerator pedal 44, i.e., the driver indicating a desire for the vehicle to accelerate. When the operator has depressed paddle 206, the transmission waits until the operator depresses the accelerator pedal 44 before a clutch engagement is begun. A negative response from step 212 causes looping through 212, until a positive response in step 212, which causes control to pass to step 214. In step 214, it is determined what kind of launch type. The strategy of the present invention applies to light launches, such as might be encountered in a parking lot maneuver. A heavy launch is, for example, an acceleration from a red light. The determination of light or heavy launch is determined by at least one of: the pedal position, θ, and a time rate of change of pedal position, d θ/dt. If it is determined that a heavy launch is requested, control passes to step 216 in which an alternate strategy is used that is not part of the present invention. If the strategy is light, control passes to step 218 in which It is determined whether the rate of change in engine speed is positive or negative. If the engine speed is in control, engine speed remains at the desired speed. But, when engine speed is not in control, engine speed ramps up and down. Because the base spark advance, $SA_b$, is MBT, adjusting spark timing cannot be used to increase engine torque, only decrease engine torque. So, If the engine speed is ramping down, no measure is taken in the engine. Instead, a measure is taken in the clutch. Step 218 is looped repeatedly until the slope of a time rate of change of engine speed (dNe/dt) is positive. At this point, control passes to step 220 in which a spark timing offset is determined. In step 222, a new spark timing is computed as the base spark timing minus the spark timing offset computed in step 220. Control passes to step 224 in which it is determined whether the clutch is fully engaged. If so, the routine of the present invention is ended in step 226. If not, control passes back to step 220, in which a new offset spark timing is determined.

Thus, the method determines a new spark timing for the spark plugs as a function of the base spark timing and said offset spark timing. This new spark timing is sent by the ECU 40 to the spark plugs.

The steps shown in FIG. 4 depend on knowing the values of a number of engine parameters. Referring now to FIG. 4A, the values of various engine parameters are determined based on signals from sensors: engine speed (Ne), vehicle speed (V), engine speed divided by engine speed (Ne/V), relative air charge (ac_rel), accelerator pedal position (θ), and engine coolant temperature (ECT) are determined, as well as time derivatives: dNe/dt and d θ/dt. Time derivatives are known to be noisy signals; thus, in step 232, these are filtered. Base spark timing ($SA_b$) is determined in the ECU 40 based on such variables as Ne, ac_rel, ECT, and others. In the strategy of FIG. 4, $SA_b$ is nominally the MBT spark advance. For fuel economy purposes, It Is desirable to operate close to or at MBT spark advance.

The relative air charge, ac_rel, is the amount of air trapped in the cylinder divided by the amount of air that could be trapped in the cylinder at standard conditions. In one embodiment, the amount of air trapped in the cylinder is based on the conditions in the engine intake, i.e., intake pressure and temperature. In an alternative embodiment, the amount of air trapped in the cylinder is determined from a mass airflow sensor (not shown in FIG. 1). Based on the mass air flowrate to the engine and the rate of intake strokes (proportional to engine speed), the mass inducted into the cylinder is computed. In either case, the trapped charge is normalized by the amount of air which could be inducted at standard pressure and temperature.

Referring now to FIG. 4A, in steps 230 and 232, various engine parameters are determined, which are used in steps 212, 214, 218, 220, and 222 of FIG. 4. Engine speed (Ne), vehicle speed (V), engine speed divided by engine speed (Ne/V), relative air charge (ac_rel), accelerator pedal position (θ), and engine coolant temperature (ECT) are determined based on sensor signals. Time derivatives are also found in step 230: dNe/dt and d θ/dt. Time derivatives are known to be noisy signals; thus, in step 232, these are filtered. Base spark timing ($SA_b$) is determined in the ECU 40 based on such variables as Ne, ac_rel, ECT, and others. In this case, $SA_b$ is nominally the MBT spark advance. For fuel economy purposes, it is desirable to operate close to or at MBT spark advance.

Referring now to FIG. 5, an alternate strategy is shown. As in the prior strategy shown in FIG. 4, the strategy begins, here in step 240, with the vehicle at rest and It is determined in step 242 whether a launch has been requested. Again, a desire for launch is indicated by the operator by depressing paddle 206 and depressing the accelerator pedal 44. If a launch is detected in step 242, control passes to step 244 in which it is determined whether it is a heavy launch or a light launch. If It is a heavy launch, control passes to step 246 in which an alternate strategy, not part of the present invention, is used. If a light launch is detected, control passes to step 250 in which a spark timing offset, $SA_{offset}$ is computed. Control passes to step 252 in which a new spark timing, $SA_{new}$ is found as the difference between $SA_b$ and $SA_{offset}$. The new spark timing is commanded to the spark plugs. Control passes to, step 254 in which it is determined whether the clutch is fully engaged. If a positive result, the routine is ended in step 256. If a negative result from step 254, control passes back to step 250 in which spark offset is determined again.

In step 260, the spark timing, $SA_{b\_tr}$, is determined; whereas, in step 230, of FIG. 4, $SA_b$ is found. As mentioned above in regards to FIG. 4, $SA_b$ is substantially the MBT spark timing. $SA_{b\_tr}$ is a spark advance which is retarded from MBT, thereby capable of providing a torque reserve, as shown in FIG. 3. By operating the spark timing at $SA_{b\_tr}$, engine torque can be increased or decreased by advanced or retarding spark timing, respectively. Thus, the method determines a desired amount of torque reserve and computes a predetermined amount of spark retardation to provide said desired amount of torque reserve.

Referring now to FIG. 5A, in steps 260 and 262, value of engine parameters are determined, which are used in steps 242, 244, 250, and 252 of FIG. 5. Engine speed (Ne), vehicle speed (V), engine speed divided by engine speed (Ne/V), relative air charge (ac_rel), accelerator pedal position ($\theta$), and engine coolant temperature (ECT) are determined based on sensor signals. Time derivatives are also found in step 250: dNe/dt and d $\theta$/dt. Time derivatives are known to be noisy signals; thus, in step 252, these are filtered. Base spark timing ($SA_{b\_tr}$) is determined in the ECU 40 based on such variables as Ne, ac_rel, ECT, and others.

in step 260 of FIG. 5A, the spark timing, $SA_{b\_tr}$ is determined; whereas, in step 230, of FIG. 4A, $SA_b$ is found. As mentioned above in regards to FIG. 4A, $SA_b$ is substantially the MBT spark timing. $SA_{b\_tr}$ is a spark advance which is retarded from MBT spark timing, thereby capable of providing a torque reserve, as shown in FIG. 3. By using a spark timing at $SA_{b\_tr}$ in the strategy of FIG. 5, engine torque can be increased or decreased by advanced or retarding spark timing, respectively, back to step 250 in which a new spark timing offset is computed.

Figure 6:
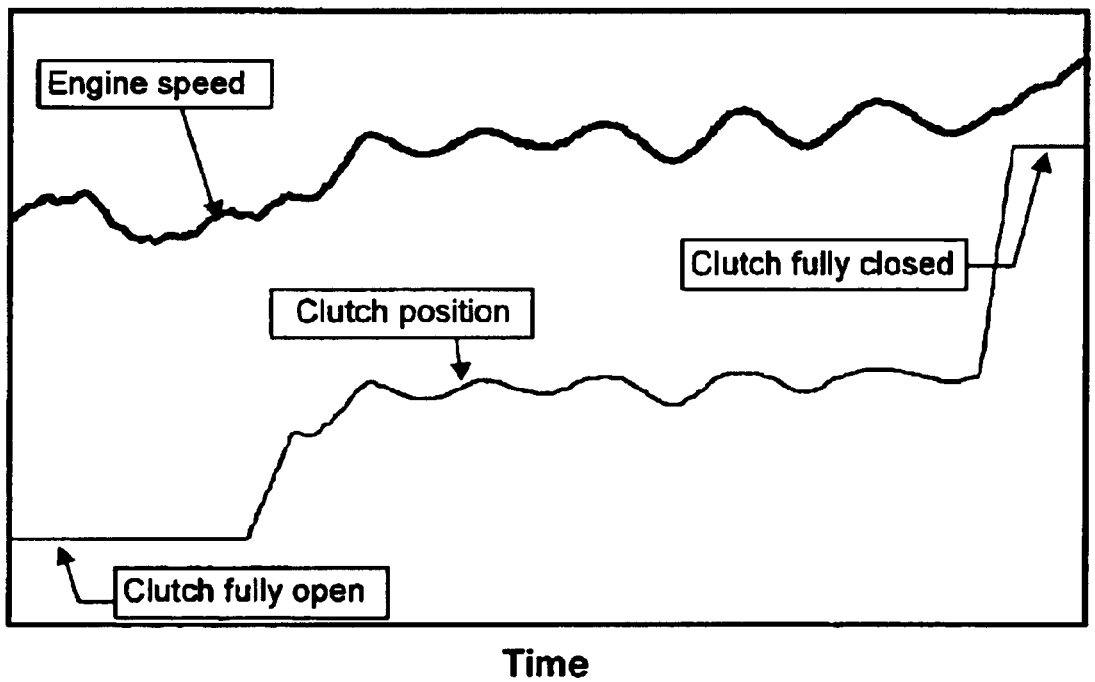
FIG. 6 is a timeline of a launch with an automatic shifting manual transmission coupled to an internal combustion engine according to the present invention.

Referring now to FIG. 6, a launch according to the present invention is shown. At the left hand side, the clutch is fully open. Shortly thereafter, the clutch is caused to close partially. By adjusting spark timing throughout the clutch engagement process, it can be seen that the clutch position and engine speed, although not perfectly constant, are much improved over the prior art (FIG. 1). As a consequence of the smooth clutch engagement, the vehicle does not buck. Instead, engine speed smoothly increases as desired by the operator.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

We claim:

1. A method of controlling spark timing for spark plugs disposed in cylinders of an internal combustion engine, the method comprising:
   determining a base spark for each spark plug;
   wherein said base spark timing is substantially a MBT (minimum spark advance for best torque) spark timing ad said offset spark timing is set to zero when dNe/dt is negative; and
   determining a time rate of change of engine speed dNe/dt;
   modifying the base timing by an offset spark timing in accordance with the determined dNe/dt.

2. The method of claim 1 wherein said engine is disposed in a vehicle, the method further comprising:
   determining that a launch request has been made by an operator of said vehicle; and
   executing said determining a base spark timing, said determining a time rate of change of engine speed, and said modifying the base timing in response to said determined launch request.

3. The method of claim 1, further comprising:
   determining a desired amount of torque reserve; and
   computing said offset spark timing to provide said desired amount of torque reserve.

4. A method for use in controlling engine torque of a vehicle having an internal combustion engine, such torque being controlled by a spark timing of spark plugs disposed in engine cylinders, a base spark timing for such spark plugs being determined in an engine control unit electrically coupled to the spark plugs, the method comprising:
   determining that a launch request has been made by an operator of the vehicle wherein said launch is determined based on a present vehicle speed being substantially zero and an operator of the vehicle pressing the accelerator pedal, said accelerator pedal being electrically coupled to the engine control unit;
   determining a time rate of change dNe/dt of engine speed during execution of the determined launch;
   determining a spark timing offset from the base timing for the spark plugs, such spark timing offset being a function of the determined dNe/dt;
   determining a new spark timing for the spark plugs, such new spark timing being a function of the base spark timing and said offset timing; and
   commanding said new spark timing to the spark plugs.

5. The method of claim 4 wherein said new spark timing is substantially the difference between the base spark timing and said offset spark timing.

6. The method of claim 4 wherein the engine is coupled to a clutch and said offset spark timing is based on a temperature which gives an indication of a temperature of the clutch.

7. The method of claim 4 wherein said temperature is an engine coolant temperature.

8. The method of claim 4 wherein said offset spark timing is based also on a relative air charge.

9. The method of claim 4 wherein said offset spark timing is based also on accelerator pedal position.

10. The method of claim 4 wherein said offset spark timing is based also on engine speed divided by a speed of said vehicle.

11. A method for use in controlling engine torque of a vehicle having an internal combustion engine, such torque being controlled by a spark timing of spark plugs disposed in engine cylinders, a base spark timing for each spark plug being determined in an engine control unit coupled to the spark plugs, the method comprising:
   determining that a launch request has been made by an operator of the vehicle;
   determining a time rate of change dNe/dt of engine speed during execution of the determined launch;
   determining a spark timing offset from the base timing for the spark plugs, such spark timing offset being a function of the determined dNe/dt;
   determining a new spark timing for the spark plugs, such new spark timing being a function of the base spark timing and said offset timing; and
   commanding said new spark timing to the spark plugs,
   wherein the engine is coupled to an automatic manual transmission via a clutch, said transmission and a driver interface are coupled to a transmission control unit and disposed in the vehicle, said driver interface is electrically coupled to said transmission control unit, said driver interface comprising an upshift paddle, and said launch is determined based on an operator of the vehicle depressing the upshift paddle.

12. A method for controlling engine torque of an internal combustion engine, such torque being controlled by a spark plug disposed in engine cylinders, a base spark timing for each spark plug being determined in an engine control unit electrically coupled to the spark plugs, the method comprising:

determining a time rate of change of engine speed, dNe/dt;

determining a spark timing offset from the base timing for the spark plugs, such spark timing offset being a function of the determined dNe/dt;

determining a new spark timing for the spark plugs, such new spark timing being a function of the base timing and said offset spark timing; and commanding said new spark timing to the spark plugs;

wherein the engine is coupled to an automatic transmission via a clutch, said transmission and a driver interface are coupled to a transmission control unit, said driver interface comprises an upshift paddle, and said launch is determined based on an operator of the vehicle depressing the upshift paddle.

13. The method of claim 12 wherein the engine is disposed in a vehicle, the method further comprising:

determining that a launch request has been made by an operator of said vehicle; and executing said commanding said new spark timing to the spark plugs when said launch request has been determined.

14. The method of claim 12 wherein said offset spark timing is based on at least one of the following: an engine, coolant temperature, a relative air charge, an accelerator pedal position, a time rate of change of said accelerator pedal position, and a time rate of change of said engine speed.

15. A method for controlling engine torque of an internal combustion engine, such torque being controlled by a spark timing of spark plugs disposed in engine cylinders, a base spark timing for each spark plug being determined in an engine control unit electrically coupled to the spark plugs, the method comprising:

determining a time rate of change engine speed, dNe/dt;

determining a spark timing offset from the base timing for the spark plugs, such spark timing offset being a function of the determined dNe/dt;

determining a new spark timing for the spark plugs, such new spark timing being a function of the base spark timing and offset spark timing; and commanding said new spark timing to the spark plugs, wherein the engine is disposed in a vehicle and said launch is determined based on a present vehicle speed being substantially zero and an operator of the vehicle depressing an accelerator pedal, said accelerator pedal being disposed in said vehicle and electronically coupled to the engine control unit.

16. A system for use in controlling engine torque in an internal combustion engine disposed in a vehicle, such torque being controlled by a spark timing of spark plugs disposed in engine cylinders, the system comprising:

an engine speed sensor; and an engine control unit electrically coupled to the engine, the spark plugs, and said engine speed sensor, said engine control unit determining a base spark timing, said engine control unit further determining an offset spark timing based on a signal form said engine speed sensor, said engine control unit further determining a new spark timing as a function of the base spark timing and said offset timing, and said engine control unit further commanding said new spark timing to the spark plugs, wherein an engine speed is determined based on said signal from said sensor and said offset spark timing is based on a time derivative of said engine speed, further comprising: a filter for filtering said time derivative of engine speed.

17. The system of claim 16, further comprising: an accelerator pedal position sensor coupled to an accelerator pedal and said engine control unit wherein accelerator pedal position sensor and said offset spark timing is based also on said accelerator pedal position and said time rate of change of pedal position.

18. The system of claim 16, further comprising: a engine coolant temperature sensor coupled to said engine control unit wherein engine coolant temperature is determined from a signal from said engine coolant temperature.

19. The system of claim 16 wherein said base spark timing is determined to provide a desired torque reserve.

20. A system for use in controlling engine torque in an internal combustion engine disposed in a vehicle, such torque being controlled by a spark timing of spark plugs disposed in engine cylinders, the system comprising:

an engine speed sensor; and an engine control unit electrically coupled to the engine, the spark plugs, and said engine speed sensor, said engine control unit determining a base spark timing, said engine control unit further determining an offset spark timing based on a signal from said engine speed sensor, said engine control unit further determining a new spark timing as a function of the base spark timing and said offset spark timing, and said engine control unit further commanding said new spark timing to the spark plugs, wherein said offset spark timing is substantially zero when said time rate of change of engine speed is less than zero and said base spark timing is substantially a MBT (minimum spark advance for best torque) spark timing.

21. A system for controlling an engine in a vehicle having an internal combustion engine, comprising:

an engine control unit for providing timing to spark plugs of the engine;

a vehicle launch sensor for sensing that a launch request has been made by an operator of the vehicle, wherein said launch sensor comprises an accelerator pedal and a vehicle speed sensor disposed in the vehicle and electrically coupled to said engine control unit; and said launch is determined based on a present vehicle speed being substantially zero and an operator of the vehicle depressing an accelerator pedal;

an engine speed sensor for measuring engine speed;

wherein such engine control unit in response to a launch sensor and engine speed sensor;

determines a time rate of change dNe/dt of engine speed during execution of the determined launch;

determines a spark timing offset from a base timing for the spark plugs, such spark timing offset being a function of the determined dNe/dt;

determines a new spark timing for the spark plugs, such new spark timing being a function of the base spark timing and said offset spark timing; and commands said new spark timing to the spark plugs.

22. A system for controlling an engine in a vehicle having an internal combustion engine, comprising:
- an engine control unit for providing timing to spark plugs of the engine;
- a vehicle launch sensor for sensing that a launch request has been made by an operator of the vehicle wherein said launch sensor comprises an upshift paddle, said upshift paddle is part of a driver interface disposed in the vehicle;
- an engine speed sensor for measuring engine speed;
- wherein such engine control unit in response to a launch sensor and engine sensor;
- determines a time rate of change dNe/dt of engine speed during execution f the determined launch;
- determines a spark timing offset from a base timing for the spark plugs, such spark timing offset being a function of the determined dNe/dt;
- determines a new spark timing for the spark plugs, such new spark timing being a function of the base spark timing and said spark timing; and
- commands said new spark timing to the spark plugs.

* * * * *